United States Patent [19]

Crutchfield

[11] Patent Number: 4,866,319

[45] Date of Patent: Sep. 12, 1989

[54] ERASING MACHINE

[75] Inventor: Mack W. Crutchfield, Dallas, Tex.

[73] Assignee: Rotex Company, Dallas, Tex.

[21] Appl. No.: 218,583

[22] Filed: Jul. 12, 1988

[51] Int. Cl.[4] .......................... H02K 7/14; B43L 19/00; A47L 5/24

[52] U.S. Cl. ....................................... 310/47; 15/3.53; 51/170 PT; 200/61.85; 310/89

[58] Field of Search ........ 15/3.55; 51/170 R, 170 PT, 51/170 T; 200/61.85; 279/41 R, 46 R; 310/40 MM, 43, 46 R, 50, 89; 363/126; 433/99, 125

[56] References Cited

U.S. PATENT DOCUMENTS

| | | | |
|---|---|---|---|
| 3,322,925 | 5/1967 | Korshak | 200/61.85 |
| 3,903,558 | 9/1975 | Anderson | 15/3.53 |
| 3,925,842 | 12/1975 | Selinder et al. | 15/3.53 |
| 4,033,077 | 7/1977 | Chester et al. | 51/170 |
| 4,808,862 | 2/1989 | Carvalho et al. | 310/89 |

Primary Examiner—Patrick R. Salce
Assistant Examiner—D. L. Rebsch
Attorney, Agent, or Firm—Kanz, Scherback & Timmons

[57] ABSTRACT

A hand-held, motor-driven erasing machine which operates directly from the nominal wall outlet voltage and comprises a generally tubular housing having a front portion and a rear portion which are releasably attached together. A chuck tube is mounted for rotational movement within the generally tubular housing. A DC permanent magnet motor is operatively disposed within the generally tubular housing and includes a wire-wound armature surrounding and attached to the chuck tube, a commutator whose brush surface is positioned at a right angle with respect to the rotational axis of the DC motor, a permanent magnet assembly operatively surrounding the wire-wound armature. A rectifier device is operatively connected to receive the AC voltage from the wall outlet and provide a DC output to the DC motor. A switch assembly is operatively connected between the output of the rectifier device and the DC motor.

21 Claims, 4 Drawing Sheets

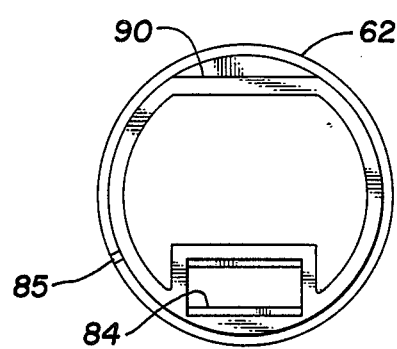
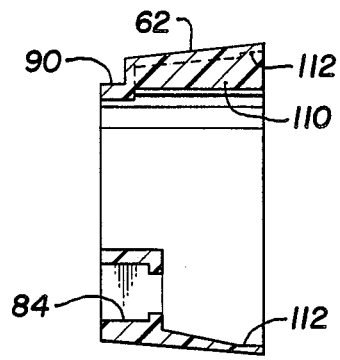
Fig. 6a     Fig. 6b
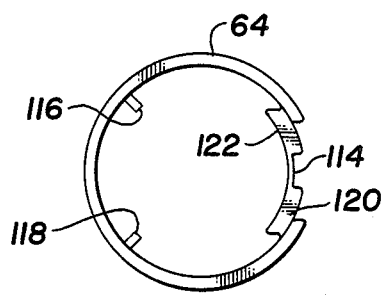
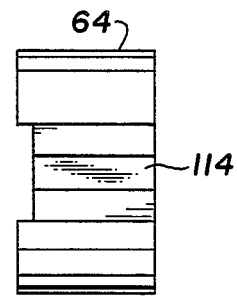
Fig. 7a     Fig. 7b
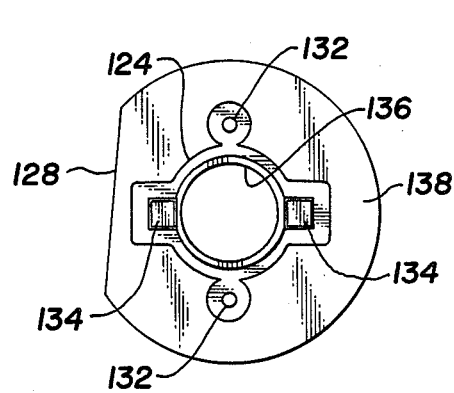
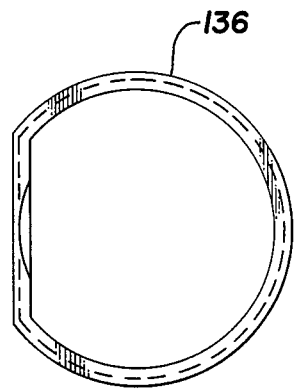
Fig. 8     Fig. 9

ERASING MACHINE

BACKGROUND OF THE INVENTION

1. Field of the Invention

This invention relates generally to motor-driven, hand held devices. More particularly, it relates to motor-driven, hand-held machines provided for doing work on various work surfaces.

2. Description of the Prior Art

Although this invention is applicable to numerous and various types of motor-driven, hand-held devices or machines, it has been found particularly useful in the environment of motor-driven, hand-held erasing machines Therefore, without limiting the applicability of the invention to "motor-driven, hand-held erasing machines", the invention will be described in such environment.

Motor-driven, hand-held erasing machines, such as those driven by both AC and DC electric motors of both cord and cordless type, have been utilized for many years. An erasing machine of this nature will generally incorporate a motor-driven mechanism that is disposed within a housing, which drive mechanism is connected to a collect chuck mechanism that receives and holds a generally cylindrical strip of erasing material, commonly known as an eraser strip. Upon manual manipulation of an on-off switch, the erasing machine, which is adapted to be hand-held, may be energized to cause rapid rotation of the eraser strip which may then be brought to bear upon a work surface in order to remove undesirable markings therefrom.

The prior art motor-driven, hand-held erasing machines are too large in diameter for many people to easily and comfortably hold them in their hand. Some prior art machines have the motor offset from the chuck tube and drive the chuck tube through a gear arrangement.

The present invention is intended to provide a solution to various prior art deficiencies which include the requirement that two hands may be required for the easy operation of the machine if the machine has a toggle-type on-off switch. Some prior art machines require a separate power converter to be used in conjunction with the machine to reduce voltage level from the nominal wall-outlet voltage. Some prior art machines are too large and/or too heavy for people with smaller hands.

SUMMARY OF THE INVENTION

The present invention provides a compact, lightweight unit which operates directly from the nominal wall-outlet voltage of 115-120 volts AC without the need for a power converter and is designed to provide a unit which is the smallest in diameter for a given output power. The unit comprises a two-piece tubular housing with means for releasably attaching the two pieces of tubular housing together, a chuck tube mounted for rotational movement within the tubular housing, a 115-120 volt DC permanent magnet motor operatively disposed within the tubular housing, a rectifier to receive the 115-120 volts AC and provide an output of 115-120 volts DC to the DC motor and a switch assembly operatively disposed between the output of the rectifier and the DC motor. The chuck tube is the shaft of the DC motor and has the wire-wound armature and commutator attached thereto. The brush surface of the commutator is positioned at a right angle with respect to the rotational axis of the DC motor to reduce the diameter of the tubular housing. The DC motor has a permanent magnet assembly comprising a generally cylindrical inner sleeve formed of a ferrite powder in a nylon binder and a generally cylindrical outer sleeve formed of steel with a slot of predetermined width formed in the wall thereof which is used as a conduit for the wires from the switch assembly to the brushes of the DC motor. The switch assembly is positioned in the forward portion of the housing and includes a switch button device, a front mounting assembly, a microswitch device and a spring device. The microswitch device is slidably received in the front mounting assembly and is activated by the switch button device when it is depressed to the "on" position. The spring device is positioned to bias the switch button device to the rest or "off" position.

Among the advantages offered by the present invention is a powerful erasing machine housed in a structure which is of a size to be easily hand-held. The present invention may be operated directly from the nominal wall-outlet AC voltage without the need for any type of power converter. The present invention has internal means for releasably attaching the two-piece housing together. The present invention provides a switch assembly which is located in a position which allows for ease of operation by the operator and a smaller diameter machine. The present invention provides a stronger permanent magnet for a given size for the permanent magnet motor in the unit.

Examples of the more important features and advantages of this invention have thus been summarized rather broadly in order that the detailed description thereof that follows may be better understood and in order that the contribution to the art may be better appreciated. There are, of course, additional features of the invention which will be described hereinafter and which will also form the subject of the claims appended hereto. Other features of the present invention will become apparent with reference to the following detailed description of a presently preferred embodiment thereof in connection with the accompanying drawing in which:

BRIEF DESCRIPTION OF THE DRAWING

FIG. 6a is a simplified front elevational view of the front mounting assembly of the present invention;

FIG. 6b is a simplified side elevational view, shown in section, of the front mounting assembly;

FIG. 7a is a simplified front elevational view of the rear mounting assembly;

FIG. 7b is a simplified side elevational view of the rear mounting assembly;

FIG. 8 is a simplified end elevational view of the brush holder assembly;

FIG. 9 is a simplified side elevational view of the brush gasket;

DESCRIPTION OF THE PREFERRED EMBODIMENT

Figure 1:
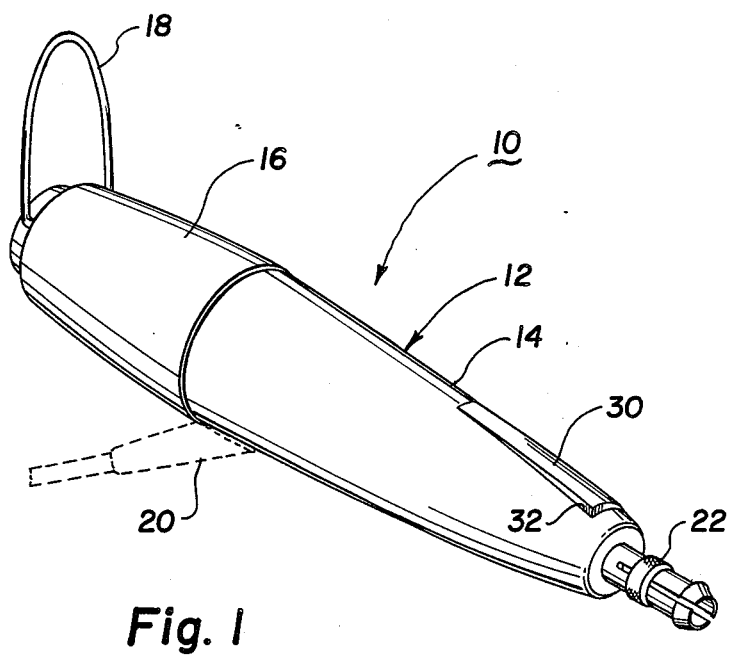
FIG. 1 is a simplified perspective view of a machine constructed in accordance with the present invention.
Figure 2:
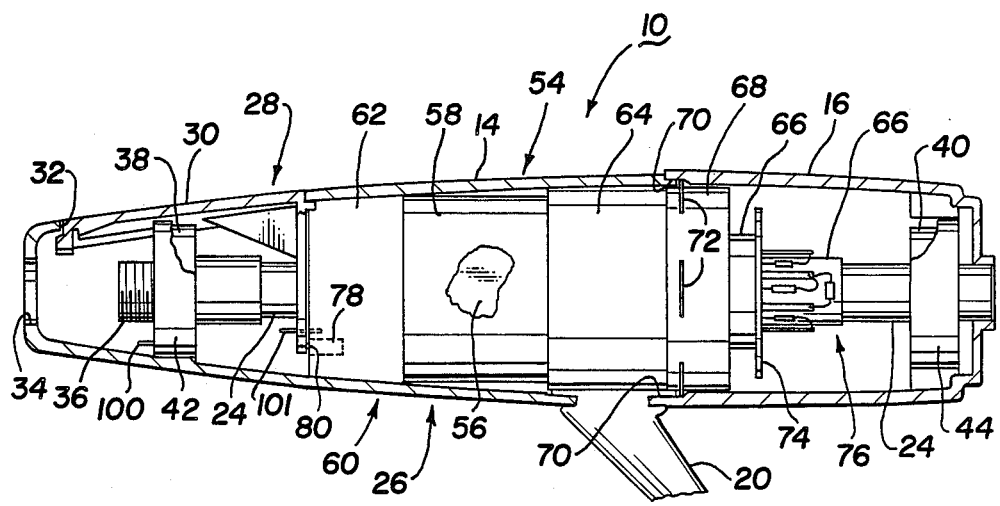
FIG. 2 is a simplified elevational view having parts thereof broken away and illustrating a machine constructed in accordance with the present invention.
Figure 3:
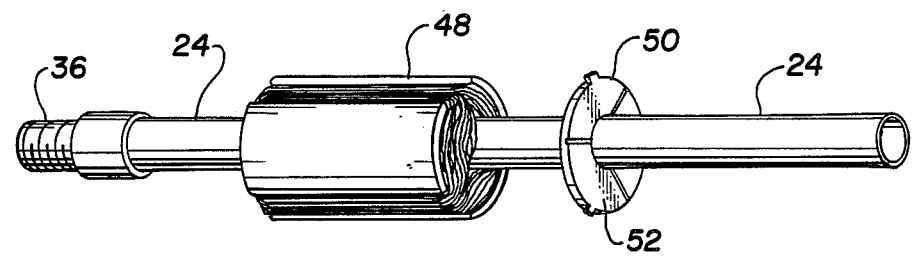
FIG. 3 is a simplified perspective view of the rotational portion of the machine.

Referring to the drawing, wherein like reference numerals designate like or corresponding elements throughout the several views, an erasing machine according to the present invention is referred to generally by reference numeral 10. With reference to FIGS. 1-3, erasing machine 10 comprises a generally tubular housing means 12 including a front portion 14 and a rear portion 16. Removably mounted to the rear portion 16 is holder means 18 which comprises a loop of wire which would coact with a hook located on a drafting table, the wall, etc. to support the erasing machine 10 when it was not being used. Electrical cord 20 is operatively connected between the erasing machine 10 and the wall-outlet (not shown) to provide the nominal wall-outlet voltage of 115-120 volts AC to the erasing machine 10. Collet 22 operates in conjunction with a chuck tube 24 to receive a generally cylindrical strip of eraser material (not shown) to be used in the erasing operation when the DC motor 26 is activated by switch assembly 28 when placed in the "on" position by depressing switch button device 30 down with respect to first opening 32 formed in the wall of front portion 14 and surrounding switch button device 30. It will be appreciated that chuck tube 24 is hollow in order to receive the generally cylindrical strip of eraser material (not shown).

With further reference to FIGS. 2 and 3, erasing machine 10 further comprises second opening 34 in the front end of front portion 14 to allow collet 22 to be inserted therethrough, to be threadably attached to threads 36 formed on chuck tube 24. Chuck tube 24 is rotatably supported in the front portion 14 by first bearing 38 and is rotatably supported in the rear portion by second bearing 40. First gasket 42 surrounds first bearing 38 while second gasket 44 surrounds second bearing 40, and are formed of a rubber or PVC compound to reduce the transmission of any vibrations to the generally tubular housing means 12 and then on to the hand of the user or operator of the erasing machine 10. Chuck tube 24 also serves as the motor shaft of the 115-120 volt DC motor 26 which comprises a wire-wound armature 48 which surrounds and is attached to chuck tube 24. Commutator 50 also surrounds and is attached to chuck tube 24. Brush surface 52 of commutator 50 is positioned at a right angle with respect to the rotational axis (chuck tube 24) of the 115-120 volt DC motor 26. This allows the brushes to be parallel to the rotational axis and allows the diameter of the generally tubular housing means 12 to be smaller.

A permanent magnet assembly 54 operatively surrounds the wire-wound armature 48 and comprises a generally cylindrical inner sleeve 56 surrounded by a generally cylindrical outer sleeve 58 permanent magnet assembly 54 is held in operative position within front portion 14 by mounting means 60 which comprises a front mounting assembly 62 and a rear mounting assembly 64.

Brush holder 66 surrounds chuck tube 24 (is coaxial therewith) and is held in position against rear mounting assembly 64 by retaining collar 68. Retaining collar 68 is held in position by a predetermined number of first cutouts 70 formed in rear portion 16 which coact with a predetermined number of first projections 72 extending from the periphery of retaining collar 68. It will be appreciated that first cutouts 70 and first projections 72 are formed and positioned around rear portion 16 and retaining collar 68 such as to be juxtaposed when rear portion 16 is attached to front portion 14.

Printed circuit board 74 is removably attached to brush holder 66, is formed in the shape of a disc, is coaxial with chuck tube 24 and includes the components and leads which comprise the rectifier means 76 which converts the 115-120 volts AC from the wall-outlet to 115-120 volts DC to operate the 115-120 volt DC motor 26.

The 115-120 volts AC from the wall-outlet is provided through electrical cord 20 to the rectifier means 76 which then provides the 115-120 volts DC for the DC motor 26. Microswitch device 78, which is slidably received in a predetermined portion of front mounting assembly 62, is operatively connected between the output of rectifier means 76 and the DC motor 26. The activating button 80 of microswitch device 78 protrudes therefrom such that it is moved by switch assembly 28 when switch button device 30 is depressed to the "on" position and causes the microswitch device 78 to provide continuity in the circuit.

Figure 4A:
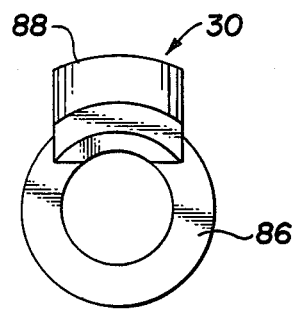
FIG. 4a is a simplified front elevational view of the switch button device.
Figure 4B:
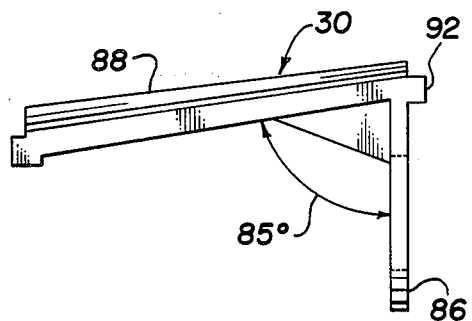
FIG. 4b is a simplified side elevational view of the switch button device.
Figure 5A:
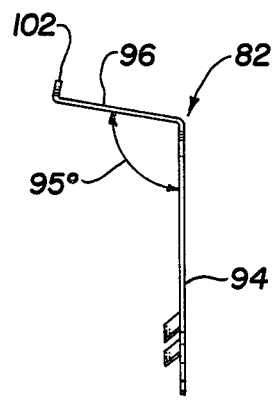
FIG. 5a is a simplified side elevational view of the spring device.
Figure 5B:
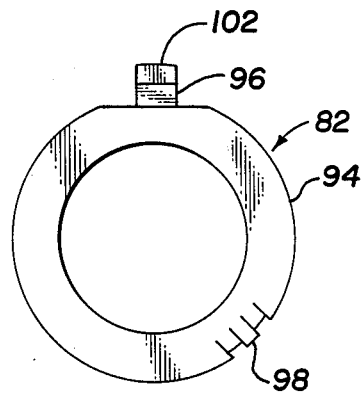
FIG. 5b is a simplified front elevational view of the spring device.

With reference to FIGS. 2 and 4a and 6b, switch assembly 28 comprises front mounting assembly 62, microswitch device 78, switch button device 30 and spring device 82. Front mounting assembly 62 is generally tubular in shape and is structured to be slidably received in the front portion 14 of the generally tubular housing means 12. Front mounting assembly 62 includes a generally rectangular cavity 84 formed on the inner wall thereof to slidably receive the microswitch device 78 therein. Switch button device 30 comprises a ring-like portion 86 and a lever portion 88 which is cantilevered from said ring-like portion 86 at approximately eighty-five degrees. Front mounting assembly 62 includes a second cutout 90 and switch button device 30 includes a second projection 92 which is structured and positioned to coact with second cutout 90 to allow pivotal movement of said switch button device 30 with respect to said front mounting assembly 62 and said microswitch device 78. When lever portion 88 of switch button device 30 is depressed to the "on" position, ring-like portion 86 presses against activating button 80 of microswitch device 78 to activate the microswitch device 78 to the "on" position and condition.

Spring device 82 comprises a ring-like portion 94 and a lever portion 96 which is cantilevered from said ring-like portion 94 at approximately ninety-five degrees. Spring device 82 is slidably positioned in the front portion 14 forward of first bearing 38. First alignment means 98 on ring-like portion 94 coacts with second alignment means 100 on the inside wall of front portion 14 to assure that lever portion 96 is aligned under lever portion 88. In the preferred embodiment, second alignment means 100 comprises ridges projecting from the inner wall of front portion 14.

With reference to FIGS. 2, 6b, 11 and 12, permanent magnet assembly 54 comprises a generally cylindrical inner sleeve 56 formed of a ferrite powder in a nylon binder and a generally cylindrical outer sleeve 58 formed of a 1010-1020 grade steel with a slot 104 of predetermined width formed in the wall thereof which is used as a conduit for the wires from the switch assembly 28 to the brushes of the DC motor 26. Generally cylindrical inner sleeve 56 includes third alignment means 106 in the form of a cutout in the end surface of the wall at a predetermined position. Generally cylindrical outer sleeve 58 includes fourth alignment means 108 in the form of a cutout in the end surface of the wall at a predetermined position. Generally cylindrical inner sleeve 56 is inserted within generally cylindrical outer sleeve 58 such that third and fourth alignment means 106, 108 are in alignment. Then generally cylindrical inner and outer sleeves 56, 58 are slidably inserted into the end of front mounting assembly 62 such that third and fourth alignment means 106, 108 receive third projection 110 which protrudes from the inner wall of front mounting assembly 62. A reduction or cutout in the thickness of the wall of front mounting assembly 62 provides a shoulder 112 which surrounds the end surface of the generally cylindrical outer sleeve 58 in a slidably receiving relationship and holds the front portion of the permanent magnet assembly 54 in position within the generally tubular housing means 12. Seventh alignment means 85 is in the form of a cutout in the front portion of front mounting assembly 62 coacts with sixth projection 101 to assure proper alignment of the front mounting assembly 62 in front portion 14. In the preferred embodiment, sixth projection 101 comprises a ridge projecting inwardly from the inner wall of front portion 14.

With reference to FIGS. 2, 7a and 7b, rear mounting assembly 64 of mounting means 60 is generally tubular in shape and is structured to be slidably received in the front portion 14 of the generally tubular housing means 12 and to slidably receive the rear end of permanent magnet assembly 54 rear mounting assembly 64 includes third cutout 114 which coacts with slot 104 to form the conduit for the wires from the switch assembly 28 to the brushes of the DC motor 26. Fourth projection 116, fifth projection 118 and surface 120 of wall 122 of rear mounting assembly 64 limit the extent of travel of the rear end of permanent magnet assembly 54 into the interior of rear mounting assembly 64.

With reference to FIGS. 2 and 8, brush holder 66 comprises a tubular portion 124 including an aperture 126 therein to be positioned around chuck tube 24. Tubular portion 124 includes fifth alignment means 128 which coacts with sixth alignment means 130 on retaining collar 68 (see FIGURE 10a) to properly align brush holder 66. Printed circuit board 74 is attached to brush holder 66 by attachment means 132 and when attached, maintains brushes 134 in operative contact with brush surface 52 of commutator 50. Electrical contact with brushes 134 is provided by contacts in printed circuit board 74.

With reference to FIGS. 8 and 9, third gasket 136 is provided in a surrounding relationship of the edge portion of disc portion 138 of brush holder 66. Third gasket 136 is formed of a rubber or PVC compound to reduce the transmission of the vibrations of the brushes 134, in their travel with respect to commutator 50, to the generally tubular housing means 12 and then on to the hand of the user or operator of the erasing machine 10.

Figure 10:
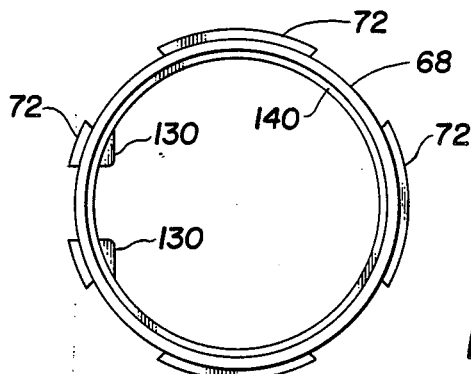
FIG. 10 is a simplified end elevational view of the retaining collar.
Figure 11:
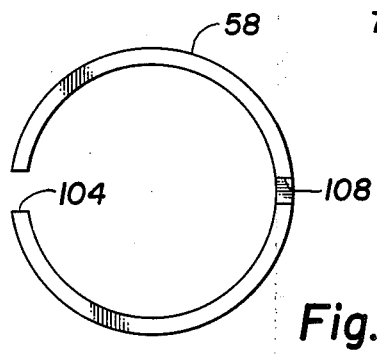
FIG. 11 is a simplified end elevational view of the generally cylindrical outer sleeve.
Figure 12:
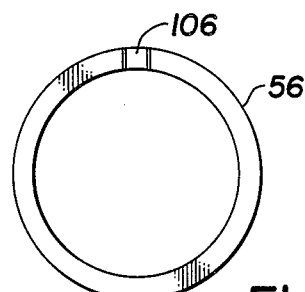
FIG. 12 is a simplified end elevational view of the generally cylindrical inner sleeve.

With reference to FIGS. 2, 8 and 10, retaining collar 68 is generally tubular in shape and is structured to be placed in abutment against rear mounting assembly 64 in the generally tubular housing means 12. Collar 140, which projects inwardly from the inside wall of retaining collar 68, rests against the third gasket 136 on the edge portion of disc portion 138 of brush holder 66 to hold and force brush holder 66 against rear mounting assembly 64. As previously mentioned, retaining collar 68 is held in position by first cutouts 70 in rear portion 16 coacting with first projections 72 extending from the periphery of retaining collar 68.

Figure 13A:
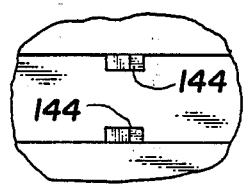
FIGURE 13a is a simplified enlarged sectional view in elevation showing the detent means.
Figure 13B:
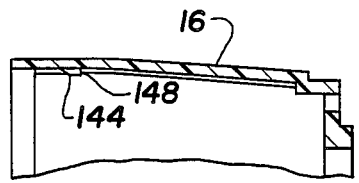
FIGURE 13b is a simplified sectional view showing the detent means in the rear portion of the housing means.
Figure 14:
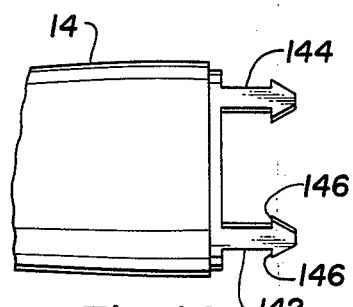
FIG. 14 is a simplified elevational view of a portion of the means for releasably attaching the front and rear portions of the housing means.
Figure 13C:
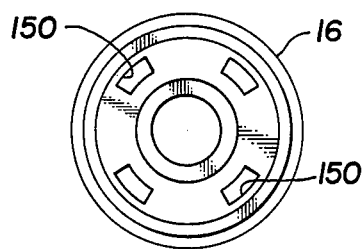
FIG. 13c is a simplified end elevational view of the rear portion of the housing means.

With reference to FIGS. 13a through 14, rectangular extensions 142 project rearwardly from said front portion 14 and have an end 144 thereon with a shape generally like that of an arrowhead. When front portion 14 and rear portion 16 are placed in an attaching relationship, rectangular extensions 142 lie along the inside of the wall of rear portion 16 and coact with detents 144 to releasably attach front and rear portions 14, 16 together. The extending portions 146 of the arrowhead-like ends interface with shoulders 148 of detents 144. Apertures 150 formed in the end of rear portion 16 are in alignment with rectangular extensions 142 and allow a tool with four prongs to be inserted through apertures 150 and force rectangular extensions 142 away from detents 144 while rear portion 16 is removed from attachment with front portion 14.

It will be appreciated that the invention provides an erasing machine which provides a powerful motor and machine for the physical size of the machine. The switch assembly is designed to reduce the diameter of the machine. The permanent magnet is designed to give great magnetic force for the physical size thereof. The commutator and brushes of the DC motor are designed to reduce the diameter of the machine. Gaskets are provided in appropriate locations to reduce the transfer of any vibrations to the operator of the machine. The front and rear portions of the housing are releasably attached together without the use of external mechanisms. The invention provides a small and powerful machine which is light in weight and of a shape which is easy to hold and use.

Although the present invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

What is claimed is:

1. A hand-held, motor-driven erasing machine which operates directly from the nominal wall-outlet voltage of 115-120 volts AC, said hand-held, motor-driven erasing machine comprising:
   (a) a generally tubular housing means including a front portion and a rear portion;
   (b) means for releasably attaching said front portion and said rear portion together;
   (c) a chuck tube mounted for rotational movement within said generally tubular housing means;
   (d) a 115-120 volt DC motor operatively disposed within said generally tubular housing means for rotational movement therein, said 115-120 volt DC motor comprising a wire-wound armature surrounding a predetermined portion of said chuck tube and attached thereto, a commutator whose brush surface is positioned at a right angle with respect to the rotational axis of said 115-120 volt DC motor, a permanent magnet assembly operatively surrounding said wire-wound armature, said permanent magnet assembly comprising a generally cylindrical inner sleeve and a generally cylindrical outer sleeve surrounding said generally cylindrical inner sleeve and a brush holder assembly operatively surrounding said chuck tube and positioned such that brushes mounted in said brush holder are operatively positioned against said commutator;
   (e) rectifier means operatively connected to receive the 115-120 volts AC and provide an output of 115-120 volts DC to said 115-120 volt DC motor; and
   (f) a switch assembly operatively connected between said output from said rectifier means and an input to said 115-120 volt DC motor.

2. The hand-held, motor-driven erasing machine of claim 1 wherein said means for releasably attaching comprises a predetermined number of rectangular extensions projecting from said front portion of said generally tubular housing means back along the inside of the wall of said rear portion of said generally tubular housing means and having an end thereon with a shape generally like that of an arrowhead, said means for releasably attaching further comprises detent means positioned on the inside of the wall of said rear portion and in alignment with said predetermined number of rectangular extensions to coact therewith and releasably attach said front portion and said rear portion.

3. The hand-held, motor-driven erasing machine of claim 2 wherein said rear portion includes a predetermined number of openings in alignment with said detent means to allow the insertion of means for releasing said arrowhead ends from said detent means.

4. The hand-held, motor-driven erasing machine of claim 1 further including mounting means for said permanent magnet assembly, said mounting means comprises a front mounting assembly and a rear mounting assembly, said front mounting assembly structured to be slidably received in said front portion of said generally tubular housing mean and comprising a generally circular shoulder projecting therefrom for slidably receiving a first end of said permanent magnet assembly in a surrounding relationship, said rear mounting assembly structured to be slidably received in said front portion of said generally tubular housing means and comprising a generally circular shoulder projecting therefrom for slidably receiving a second end of said permanent magnet assembly in a surrounding relationship.

5. The hand-held, motor-driven erasing machine of claim 4 further including third alignment means on said generally cylindrical inner sleeve, a fourth alignment means on said generally cylindrical outer sleeve and a third projection on said front mounting assembly, whereby said first and second alignment means and third projection coact to assure proper alignment of said generally cylindrical inner sleeve, said generally cylindrical outer sleeve and said front mounting assembly.

6. The hand-held, motor-driven erasing machine of claim 5 further including a seventh alignment means on said front mounting assembly and a sixth projection on the inner surface of said front portion, whereby said seventh alignment means and said sixth projection coact to assure proper alignment of said front mounting assembly in said front portion.

7. The hand-held, motor-driven erasing machine of claim 4 wherein said generally cylindrical inner sleeve comprises a ferrite powder in a nylon binder.

8. The hand-held, motor-driven erasing machine of claim 4 wherein said generally cylindrical outer sleeve comprises a 1010-1020 grade steel with a slot of predetermined width cut through the wall thereof for the full length thereof.

9. The hand-held, motor-driven erasing machine of claim 8 wherein said rear mounting assembly includes a third cutout cut into the outside surface of the wall thereof which coacts with the slot in said generally cylindrical outer sleeve to provide a channel for wiring.

10. The hand-held, motor-driven erasing machine of claim 1 wherein said commutator is structurally attached to said chuck tube for rotational movement therewith.

11. The hand-held, motor-driven erasing machine of claim 1 wherein said switch assembly comprises:
   (a) a microswitch device structured to provide electrical continuity when activated to the "on" position;
   (b) an opening of predetermined size and shape formed in the wall of said front portion;
   (c) a front mounting assembly structured to be slidably received in said front portion of said generally tubular housing in a position rearwardly of said opening, said front mounting assembly structured to slidably receive said microswitch device in a predetermined portion thereof;
   (d) a switch button device structured to activate said microswitch device when said switch button device is depressed from a rest position to an "on" position, said switch button device comprising a ring-like portion and a lever portion which is cantilevered from said ring-like portion at approximately eighty-five degrees;
   (e) a spring device structured and positioned to bias said switch button device to the rest position.

12. The hand-held, motor-driven erasing machine of claim 11 wherein said front mounting assembly includes a second cutout in a predetermined location, said switch button device includes a second projection from said ring-like portion, said second projection structured and positioned to coact with said cutout to allow pivotal movement of said switch button device with respect to said front mounting assembly and said microswitch device, whereby said microswitch device is activated to the "on" position by said ring-like portion upon sufficient pivotal movement of said switch button device from said rest position.

13. The hand-held, motor-driven erasing machine of claim 11 wherein said lever portion is structured to substantially fill said opening and is positioned with respect to said opening such as to be capable of being depressed by a force external to said generally tubular housing.

14. The hand-held, motor-driven erasing machine of claim 11 wherein said spring device comprises a ring-like portion and a lever portion which is cantilevered from said ring-like portion and is positioned under said lever portion of said switch button device to bias said switch button device to the rest position.

15. The hand-held, motor-driven erasing machine of claim 14 wherein said spring device further comprises first alignment means on said ring-like portion which coacts with said front portion of said generally tubular housing to maintain said lever portion in a position under said lever portion of said switch button device.

16. The hand-held, motor-driven erasing machine of claim 1 wherein said rectifier means is mounted on said brush holder assembly.

17. In combination with a hand-held, motor-driven machine including a generally tubular housing having a front portion and a rear portion, said front portion having an opening of predetermined size and shape in the wall thereof, a switch assembly comprising:

(a) a microswitch device structured to provide electrical continuity when activated to the "on" position;

(b) a front mounting assembly structured to be slidably received in said front portion of said generally tubular housing in a position rearwardly of said opening, said front mounting assembly structured to slidably receive said microswitch device in a predetermined portion thereof;

(c) a switch button device structured to activate said microswitch device when said switch button device is depressed from a rest position to an "on" position, said switch button device comprising a ring-like portion and a lever portion which is cantilevered from said ring-like portion at approximately eighty-five degrees;

(d) a spring device structured and positioned to bias said switch button device to the rest position.

18. The combination of claim 17 wherein said front mounting assembly includes a second cutout in a predetermined location, said switch button device includes a second projection from said ring-like portion, said second projection structured and position to coact with said cutout to allow pivotal movement of said switch button device with respect to said front mounting assembly and said microswitch device, whereby said microswitch device is activated to the "on" position by said ring-like portion upon sufficient pivotal movement of said switch button device from said rest position.

19. The combination of claim 17 wherein said lever portion is structured to substantially fill said opening and is positioned with respect to said opening such as to be capable of being depressed by a force external to said generally tubular housing.

20. The combination of claim 17 wherein said spring device comprises a ring-like portion and a lever portion which is cantilevered from said ring-like portion and is positioned under said lever portion of said switch button device to bias said switch button device to the rest position.

21. The combination of claim 20 wherein said spring device further comprises first alignment means on said ring-like portion which coacts with said front portion of said generally tubular housing to maintain said lever portion in a position under said lever portion of said switch button device.

* * * * *